United States Patent
Inokuma et al.

(10) Patent No.: US 7,727,626 B2
(45) Date of Patent: Jun. 1, 2010

(54) LIGHT DIFFUSION PLATE AND ITS PRODUCTION PROCESS

(75) Inventors: Hisao Inokuma, Chiyoda-ku (JP); Toshihiko Higuchi, Chiyoda-ku (JP); Akira Mitsui, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/949,801

(22) Filed: Dec. 4, 2007

(65) Prior Publication Data

US 2008/0090063 A1    Apr. 17, 2008

Related U.S. Application Data

(63) Continuation of application No. PCT/JP2006/309425, filed on May 10, 2006.

(30) Foreign Application Priority Data

Jun. 6, 2005    (JP) .............................. 2005-165908

(51) Int. Cl.
*B32B 5/16* (2006.01)
*B05D 5/06* (2006.01)
*G03B 21/56* (2006.01)
*G03B 21/60* (2006.01)

(52) U.S. Cl. ...................... 428/323; 428/220; 428/221; 427/162; 427/163.1; 427/163.4; 427/164; 427/165; 359/453; 359/443; 359/456; 359/457

(58) Field of Classification Search ................ 428/220; 359/453; 385/129–131
See application file for complete search history.

(56) References Cited

U.S. PATENT DOCUMENTS 6,185,038 B1 *    2/2001    Yamaguchi et al. ......... 359/457

(Continued)

FOREIGN PATENT DOCUMENTS

JP    2000-180973 A    6/2000

(Continued)

OTHER PUBLICATIONS

U.S. Appl. No. 12/364,057, filed Feb. 2, 2009, Inokuma, et al.
U.S. Appl. No. 12/503,877, filed Jul. 16, 2009, Inokuma, et al.

*Primary Examiner*—David R Sample
*Assistant Examiner*—Prashant J Khatri
(74) *Attorney, Agent, or Firm*—Oblon, Spivak, McClelland, Maier & Neustadt, L.L.P.

(57) ABSTRACT

A light diffusion plate has a substrate and a light diffusion layer formed on the substrate. The light diffusion layer is composed of at least two layers: a first light diffusion layer containing a first matrix and a first light diffusion agent having a refractive index difference $\Delta n_1$ of $0.04 \leq \Delta n_1 \leq 0.2$ with the first matrix, and a second light diffusion layer containing a second matrix and a second light diffusion agent having a refractive index difference $\Delta n_2$ of $0.005 \leq \Delta n_2 \leq 0.01$ with the second matrix. The volume fraction of the first light diffusion agent in the first light diffusion layer is less than 40%, the volume fraction of the second light diffusion agent in the second light diffusion layer is at least 40% and the total thickness of the light diffusion layers is from 5 to 200 μm after curing.

13 Claims, 3 Drawing Sheets

U.S. PATENT DOCUMENTS

2003/0174396 A1* 9/2003 Murayama et al. .......... 359/453
2004/0257650 A1* 12/2004 Parusel et al. ............... 359/453

FOREIGN PATENT DOCUMENTS

| JP | 2002-236319 A | 8/2002 |
| JP | 2002-357868 A | 12/2002 |
| JP | 2003-131325 A | 5/2003 |
| JP | 2003-131326 A | 5/2003 |
| JP | 2004-271923 A | 9/2004 |
| WO | WO2004042471 A1 * | 5/2004 |

* cited by examiner

LIGHT DIFFUSION PLATE AND ITS PRODUCTION PROCESS

BACKGROUND OF THE INVENTION

1. Field of the Invention

The present invention relates to a transmission screen to be used for projection televisions, microfilm readers, etc., a light diffusion plate to be used mainly therefor and its production process.

2. Discussion of Background

A projection television (PTV), particularly a rear-projection (rear type) PTV 10 (see FIG. 4) of a system wherein projected light from an optical engine (projector) 11 is projected to the rear side of a screen 13 via a first-surface mirror 12 to transmit an enlarged image has attracted attention, which may realize a large screen for home theater and the like at a low cost. The above screen (transmission type) 13 comprises, as shown in FIG. 5, at least two lens sheets of a Fresnel sheet 2 which emits diffused light from the first-surface mirror as approximately parallel rays and a lenticular sheet 3 which emits the approximately parallel rays from the Fresnel sheet 2 as enlarged in the horizontal direction. Further, a protector 4 having functions of lens protection, low reflection/anti-glare, fingerprint removal, etc. is commonly disposed on the emission side of the lenticular sheet 3. The numerical symbol 31 designates a light shielding layer.

In the above screen for PTV, the horizontal viewing angle is enlarged by the lens action of the lenticular sheet 3, whereas enlargement of the vertical viewing angle utilizes light diffusion property of a light diffusion agent. As the light diffusion agent, a material containing fine particles having a particle size of about from 1 to 30 µm has been used. The embodiment of the material containing such fine particles, the fine particles may be kneaded in the protector 4, or a diffusion membrane containing the fine particles is laminated on the protector 4.

Further, along with the wide spread use of a microdisplay (MD) type high precision projector employing a matrix pixel structure such as liquid crystal or DMD (Digital Micromirror Device, tradename) as an optical engine in a PTV, unnecessary glare (flicker) phenomenon visible in a projected image, called scintillation, becomes outstanding. However, the principle of the scintillation, to what extent the scintillation is tolerable, and its quantitative evaluation method have not yet been established.

Light diffusion agents which can be used for an MD type PTV which involves problems of the scintillation phenomenon have been proposed. Particularly, it has been proposed to combine two or more different types of light diffusion agents so as to secure the original high precision image without decreasing the resolution.

For example, in a case where a light diffusion agent is incorporated in a substrate of the Fresnel sheet and/or the lenticular sheet, and each lens sheet has two light diffusion layers, it has been proposed that from the light transmission side, a light diffusion layer comprising an organic material having a uniform shape and then a light diffusion layer comprising an inorganic material such as silica are disposed in this order (Patent Document 1). Patent Document 1 discloses that by the above disposition, the light diffusion layer of the lenticular sheet closest to the observer is a light diffusion layer (hard coat) comprising an inorganic material which is in many cases in the form of non-uniform scales, whereby the surface of the light diffusion layer is properly roughened, and no glare is likely to occur. In Example, a hard coat layer (thickness: 20 µm) is formed by a ultraviolet-curable acrylic resin having silica dispersed therein at a concentration of 30% on one side of a transparent resin substrate by coating, and on the other side of the substrate, an organic layer (thickness: 20 µm) is formed from an acrylic resin having MS (acrylic/styrene copolymer) crosslinked beads dispersed at a concentration of 10% by coating, and the substrate is laminated on a lenticular sheet employing the organic layer as an adhesive layer.

As another example of combining an inorganic material and an organic material, disposition opposite to the above relative to the light transmission direction has been proposed (Patent Document 2). Patent Document 2 discloses an object to prevent hot spot phenomenon such as a local increase in the brightness of incident light from a projector and scintillation phenomenon (unnecessary flicker visible in the projected image) caused by a small exit pupil diameter of a projector lens of a PTV employing a high precision liquid crystal panel as compared with a CRT type PTV. It discloses, to is achieve the above object, a transmission screen comprising a first light diffusion sheet having a thickness of from 500 to 1,000 µm containing organic fine particles having an average particle size of from 5 to 15 µm in an amount of from 5 to 20 wt % in a base material, and a second light diffusion sheet having a thickness of from 50 to 500 (or 5,000) µm containing inorganic fine particles having an average particle size of from 2 to 10 µm in an amount of from 1 to 10 wt % in a base material. It discloses disposition of the first diffusion sheet on the observer side and the second diffusion sheet on the projector side (FIG. 2B of Patent Document 2).

Further, to provide a transmission screen which overcomes the problem of the hot spot phenomenon and the scintillation phenomenon in the same manner as in Patent Document 2, and which provides a bright image with high resolution, with large viewing angles in both horizontal and vertical directions, excellent in contrast and being clear, at a relatively low cost, a transmission screen has been proposed (Patent Document 3) in which at least one of the Fresnel sheet and the lenticular sheet has a structure of at least two layers differing in the concentration of dispersion of the light diffusion agent in the sheet substrate thickness direction. Patent Document 3 discloses that the light diffusion layer having a multilayer structure is suitable to desirably control the light diffusion property as the entire light diffusion substrate or depending upon the lens properties of the lens sheet, and specifically, it discloses a structure having two types of light diffusion layers having a thickness of 20 µm on a transparent substrate and a combination of inorganic materials or an inorganic material with an organic material as materials of the diffusion agent. However, it only discloses, as specific concentration distribution, a combination of a layer containing the diffusion agent in an amount of 30% and a layer containing it in an amount of 15%.

As another example of a transmission screen for the same purpose as the above transmission screen having a light diffusion layer in a multilayer structure differing in the concentration distribution of the light diffusion agent, a transmission screen having two layers of a first light diffusion layer (thickness: 50 to 200 µm) containing a light diffusion agent in an amount of from 20 to 50 wt % and a second light diffusion layer (thickness: 500 to 5,000 µm) containing a light diffusion agent in an amount of from 0.1 to 10.0 wt % has been disclosed (Patent Document 4). The light diffusion agent disclosed in Patent Document 4 is translucent fine particles having a weight average particle size of from 1 to 12 µm for each layer, and the translucent fine particles contained in the first light diffusion layer are limited to ones having a refractive index difference Δn of from 0.07 to 0.17 with the base material (translucent plastic), and the second light diffusion layer is defined to have a haze of from 50 to 85% of the entire layer. With respect to the above Δn of the translucent fine particles contained in the second light diffusion layer, a value of from 0.01 to 0.1 which is smaller than that in the first light diffusion layer is exemplified. The specific layer structure disclosed in Patent Document 4 is such a structure that on a thick substrate (second light diffusion layer) containing a light diffusion agent having a small Δn in a small amount (from 0.1 to 10 wt %), a light diffusion layer (first light diffusion layer) containing a light diffusion agent having a large Δn in a large amount (from 20 to 50 wt %) is laminated.

Use of a glass plate as a substrate on which a light diffusion layer is laminated has been proposed (Patent Document 5).

Patent Document 1: JP-A-2003-131325
Patent Document 2: JP-A-2003-131326
Patent Document 3: JP-A-2002-236319
Patent Document 4: JP-A-2000-180973
Patent Document 5: JP-A-2002-357868

SUMMARY OF THE INVENTION

The thickness of the layer (membrane or base material) containing the light diffusion agent and the amount of the light diffusion agent are highly related with the screen properties. Namely, a sufficient effect of enlarging the viewing angle will be obtained when the light diffusion layer is thick and the light diffusion agent is multiply-present in the light transmission direction. Further, the rigidity of the light diffusion layer can be secured by the layer having a thickness to a certain extent. On the other hand, if the light diffusion layer is thick, the imaging surface tends to be thick (the number of image-formation in the thickness direction tends to be large), whereby the resolution tends to decrease essentially, and the larger the amount of the light diffusion agent in the light transmission direction, the more the peak gain (the brightness of the image) tends to decrease.

A method of quantitatively evaluating the scintillation has not yet been established, but it is estimated that the scintillation is outstanding in a MD type PTV because the projected light has high directivity and has a high brightness in a specific direction, whereby light scattered by fine irregularities on the screen surface or by the diffusion agent is likely to be visually observed as glaring light. This is estimated to be because entrance of RGB lights from an MD type projector linearly to the lenticular sheet as synthetic light. Accordingly, as compared with a CRT type PTV in which each of RGB lights from the projector enters the lenticular sheet (lens) at a different angle, with an MD type PTV, a high precision image with high contrast (high S/N ratio) is likely to be obtained, whereas scintillation is likely to occur.

The object of the present invention is to provide a transmission screen to be used for a PTV, particularly a transmission screen suitably used for a high precision PTV on which an optical engine such as MD is mounted, and a light diffusion plate to be used therefor. Particularly, the object of the present invention is to provide a highly rigid transmission screen capable of coping with enlargement of a screen when a glass plate is used as a substrate, and a light diffusion plate to be used therefor. More specifically, the object of the present invention to provide a light diffusion plate which not only satisfies both the enlargement of the viewing angle by a light diffusion layer and the peak gain but also secures high resolution and high contrast, and which further can reduce scintillation even when used for a high precision PTV, and which is also excellent in durability such as abrasion resistance and weather resistance, its production process, a transmission screen using such a diffusion plate, and a rear-projection television using the transmission screen.

Under these circumstances, to develop a transmission screen containing a light diffusion agent, considering probability that the lens design of a lens sheet is changed along with changes of an optical engine by upgrading of an optical engine and probability that the screen becomes large, it is considered that by the light diffusion layer being an independent diffusion plate, it is less likely to be restricted by the type of the lens sheet, such being highly useful.

Further, a high rigidity light diffusion plate will easily be obtained by employing a structure in which a light diffusion layer is laminated on a transparent substrate. The present inventors have conducted extensive studies to make such a diffusion plate have diffusibility which satisfies screen properties required for a PTV, particularly diffusibility suitable also for a high precision PTV. It has been known that the scintillation is suppressed by incorporating a light diffusion agent in a large amount or by making the light diffusion layer thick to increase the diffusibility, however, the peak gain, the resolution and the contrast tend to decrease. Accordingly, it is required to acquire balance between such properties and the diffusibility (enlargement of the viewing angle).

The present inventors have found that even if the diffusibility represented by the macro index such as the haze or the viewing angle is increased, only the scintillation becomes indistinctive along with a decrease of the peak gain, and the effect of suppressing the scintillation is not necessarily sufficient. They have conceived that a certain property of the light diffusion agent is important to obtain favorable diffusibility including the effect of suppressing the scintillation. Particularly, they have noted a refractive index difference (Δn) between the matrix and the light diffusion agent forming the light transmission layer i.e. the diffusing power of the light diffusion agent and conducted studies on a method to uniformalize the diffusibility, and conceived, for the light diffusion layer to be laminated on a substrate, a two layer structure which is a combination of a layer containing a light diffusion agent having a large Δn at a low density (low volume fraction) and a layer containing a light diffusion agent having a small Δn at a high density (high volume fraction). They have further conducted studies on such a laminated structure and as a result, found that by a two layer structure of a first light diffusion layer containing a light diffusion agent which satisfies the above Δn of $0.04 \leq \Delta n_1 \leq 0.2$ at a low density with a volume fraction less than 40% and a second light diffusion layer containing a light diffusion agent which satisfies $0.005 \leq \Delta n_2 < 0.04$ at a high density with a volume fraction of at least 40%, the total thickness of the light diffusion layers can be reduced, and the peak gain and the resolution can be secured, and further, by the above combination of specific layers, the diffusibility can be uniformalized as a whole, whereby the scintillation can be reduced.

As a means for evaluating diffusion uniformity, for example, a method of bringing in the entire screen by a CCD camera type brightness photometer and evaluating the dispersion of the brightness may be mentioned.

Further, in this specification, the refractive index difference (Δn) between the matrix and the light diffusion agent means the absolute value of the difference in the refractive index between the matrix and the light diffusion agent.

In the above light diffusion layer, by the second light diffusion layer containing a light diffusion agent having a small Δn i.e. having a small diffusing power and providing a slight diffraction to transmitted light at a high density, the number of very small diffusions is increased to uniformalize the diffusion. Further, by the first light diffusion layer containing a light diffusion agent having a large Δn i.e. having a high diffusing power, diffusion different from the second light diffusion layer due to the difference in Δn is achieved, whereby the diffusion can be uniformalized thereby to reduce the scintillation. Further, in the second light diffusion layer which contains the light diffusion agent at a high density, the number of diffusions can be secured even if the layer is thin. Further, in the first light diffusion layer, when a light diffusion agent having a large Δn is used, even a thin membrane containing it in a small amount can enlarge the viewing is angle, whereby the thickness of the entire light diffusion layer can be reduced, and reduction of the scintillation can be attained without decreasing the peak gain and without impairing the resolution and the contrast. With respect to the above light diffusion layer, it is preferred that the first light diffusion layer and the second light diffusion layer are laminated in this order on the substrate, and it is particularly preferred that the second light diffusion layer is disposed on the transmitted light incident side.

Further, the present inventors have found that the scintillation can be further prevented by the second light diffusion layer containing a plural types of light diffusion agents. They have confirmed that a diffusion plate having such a structure satisfies the above properties and accomplished the present invention as follows.

The present invention provides a light diffusion plate comprising a substrate and a light diffusion layer formed on the substrate, wherein the light diffusion layer comprises at least two layers of a first light diffusion layer containing a first matrix and a first light diffusion agent having a refractive index difference $\Delta n_1$ of $0.04 \leq \Delta n_1 \leq 0.2$ with the first matrix, and a second light diffusion layer containing a second matrix and a second light diffusion agent having a refractive index difference $\Delta n_2$ of $0.005 \leq \Delta n_2 < 0.04$ with the second matrix; the volume fraction of the first light diffusion agent in the first light diffusion layer is less than 40%, and the volume fraction of the second light diffusion agent in the second light diffusion layer is at least 40%; and the total thickness of the light diffusion layers is from 5 to 200 μm by the thickness after curing.

The present invention further provides a light diffusion plate comprising a substrate and a light diffusion layer formed on the substrate, wherein the light diffusion layer comprises at least two layers of a first light diffusion layer containing a first matrix and a first light diffusion agent having a refractive index difference $\Delta n_1$ of $0.04 \leq \Delta n_1 \leq 0.2$ with the first matrix, and a second light diffusion layer containing a second matrix and a second light diffusion agent having a refractive index difference $\Delta n_2$ of $0.005 \leq \Delta n_2 < 0.04$ with the second matrix; a plural types of the first light diffusion agents and/or the second light diffusion agents are used; the volume fraction of the first light diffusion agent in the first light diffusion layer is less than 35%, and the volume fraction of the second light diffusion agent in the second light diffusion layer is at least 35%; and the total thickness of the light diffusion layers is from 5 to 200 μm by the thickness after curing.

A light diffusion layer having a two layer structure specified by the above Δn and volume fraction has not known yet.

For example, Patent Document 1 discloses a structure in which a hard coat layer A (20 μm) at a silica concentration of 30% and an organic layer B (20 μm) at a MS crosslinked beads concentration of 10% are separately laminated on both sides of a transparent resin substrate. However, Patent Document 1 fails to disclose the Δn and the volume fraction of the respective layers. Patent Document 1 is characterized by utilizing the shape of fine particles, and discloses that the concentration of the light diffusion agent can not be increased since such an increase leads to decrease in the front brightness and is basically different from the present invention.

Further, Patent Document 2 discloses a two layer structure comprising a first light diffusion sheet containing from 5 to 20 wt % of organic fine particles and a second light diffusion sheet containing from 1 to 10 wt % of inorganic fine particles, but the first light diffusion sheet alone is so thick as from 500 to 1,000 μm.

Patent Document 3 which discloses a structure in which two light diffusion layers (20 μm each) containing a light diffusion agent are laminated on one side of a transparent substrate, fails to specifically disclose the Δn and the volume fraction of the respective layers. By use of inorganic and organic light diffusion agents in combination, the respective layers may differ in Δn from each other in some cases, but an embodiment such that a light diffusion agent having a small Δn is contained at a high density with a volume fraction exceeding 40% and its necessity are not disclosed.

Further, what is disclosed in Patent Document 3 is a structure in which two or more resin layers (light diffusion layers) containing a light diffusion agent are laminated on one side of a transparent resin substrate containing no light diffusion agent, and the transparent resin substrate is laminated via an adhesive layer so that the other surface of the transparent resin substrate faces a lenticular lens. Such a structure has a problem that the resolution of the projected image tends to decrease since the distance between the lenticular lens and the diffusion layers is long.

Further, a light diffusion plate disclosed in Patent Document 4 which specifies the Δn of layers in a two layer structure, has such a structure that on a substrate containing a light diffusion agent having a small Δn at a low concentration (from 0.1 to 10 wt %), a layer containing a light diffusion agent having a large Δn at a high concentration (from 20 to 50 wt %) is laminated, and the entire light diffusion layer has a thickness of at least 500 μm. Further, the relation between the degree of the Δn and the concentration of the respective layers is opposite to the present invention i.e. combination of the layer containing a light diffusion agent having a large Δn at a low density (low volume fraction) and a layer containing a light diffusion agent having a small Δn at a high density (high volume fraction).

In the preferred embodiment of the present invention, the volume fraction of the first light diffusion agent in the first light diffusion layer is at least 10% and less than 40%, and the volume fraction of the second light diffusion agent in the second light diffusion layer is at least 40% and at most 60%.

The above substrate is preferably a glass substrate. In the above, preferably the second light diffusion layer is formed on the substrate via the first light diffusion layer as contacted to the first light diffusion layer. The second light diffusion layer is preferably disposed on the transmitted light incident side.

Such a first light diffusion layer and a second light diffusion layer can be formed as coating films.

Specifically, the present invention provides a process for producing a light diffusion plate comprising a substrate and a light diffusion layer formed on the substrate, which comprises applying a coating liquid for forming a first light diffusion layer which contains a first matrix forming component and a first light diffusion agent having a refractive index difference $\Delta n_1$ of $0.04 \leq \Delta n_1 < 0.2$ with the first matrix forming component and has a volume fraction in the liquid of the first light diffusion agent less than 40%, to the substrate; and applying a coating liquid for forming a second light diffusion layer which contains a second matrix forming component and a second light diffusion agent having a refractive index difference $\Delta n_2$ of $0.005 \leq \Delta n_2 \leq 0.04$ with the second matrix forming component and has a volume fraction in the liquid of the second light diffusion agent of at least 40%, to the substrate to form light diffusion layers.

The present invention further provides a transmission screen comprising a Fresnel sheet, a lenticular sheet and the above light diffusion plate, wherein the Fresnel sheet, the lenticular sheet and the light diffusion plate are disposed in this order so that the light diffusion layer side of the light diffusion plate is on the lenticular sheet side.

The transmission screen of the present invention is suitable as a screen for a rear-projection television.

With the light diffusion plate of the present invention, a favorable viewing angle (dispersibility) can be obtained without decreasing the peak gain and further, the scintillation can be reduced. Accordingly, it is possible to secure high resolution and high contrast of projected light particularly from an optical engine.

Particularly a light diffusion plate using a glass plate as the substrate is excellent in durability such as abrasion resistance and weather resistance. Further, it is less likely to be influenced by change of design of the lens sheet and has high general purpose properties. The transmission screen of the present invention using such a diffusion plate is suitable as a screen for a rear-projection PTV, particularly a screen for a high precision MD type PTV.

MEANINGS OF SYMBOLS

1: Diffusion plate
2: Fresnel sheet (lens sheet)
3: Lenticular sheet (lens sheet)
31: Light shielding layer
10: Transmission screen
100: Substrate
101: First light diffusion layer (light diffusion layer)
102: Second light diffusion layer (light diffusion layer)
110: Light diffusion layer

DETAILED DESCRIPTION OF THE PREFERRED EMBODIMENTS

Figure 1:
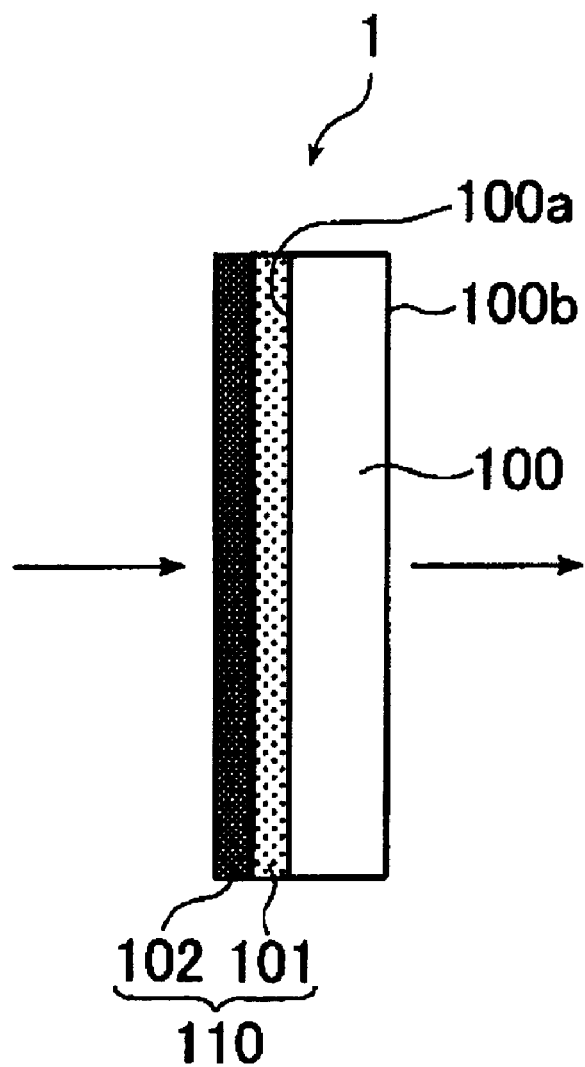
FIG. 1 is a sectional side view illustrating the diffusion plate of the present invention.

Now, the present invention will be described with reference to drawings. FIG. 1 is a sectional side view schematically illustrating the light diffusion plate of the present invention. In FIG. 1, a light diffusion plate 1 comprises a substrate 100 and a light diffusion layer 110 having a light diffusion agent dispersed in a matrix, formed on the surface 100a of the substrate. The diffusion layer 110 may be formed on one side of the substrate 100 or may be formed on both sides. The light diffusion layer 110 comprises at least two layers containing light diffusion agents differing in the refractive index difference $\Delta n$ with the matrix from each other. Specifically, on the surface 100a, a light diffusion layer comprising a first light diffusion layer 101 containing a first light diffusion agent having, as the above $\Delta n$, $\Delta n_1$ of $0.04 \leq \Delta n_1 \leq 0.2$ and a second light diffusion layer 102 containing a second light diffusion agent having a $\Delta n_2$ of $0.005 \leq \Delta n_2 < 0.04$ is formed. In FIG. 1, the allow indicates the light transmission direction in a case where the light diffusion plate 1 is applied to a transmission screen for a PTV or the like. FIG. 1 indicates an embodiment of the preferred order of layers in which the light diffusion layer 110 is laminated on the substrate 100 in the order of the first light diffusion layer 101 and the second light diffusion layer 102, but the second light diffusion layer 102 and the first light diffusion layer 101 may be laminated in the opposite order, that is, the first light diffusion layer 101 may be laminated via the second light diffusion layer 102.

In this specification, the matrix is a material forming the layer itself of the light diffusion layer, and specifically, it means a layer component comprising a matrix forming component as described hereinafter and in some cases, a curing agent required for curing the matrix forming component. Further, the refractive index of the matrix means the refractive index of the layer (cured product) formed from the matrix forming component, and is substantially the same as the refractive index of the matrix forming component contained in a coating liquid for forming a light diffusion layer as described hereinafter.

The substrate is preferably a transparent substrate so as to fulfill a function as a diffusion plate, and specifically, it preferably has a visible light transmittance (JIS K7361-1 (1997)) of at least 85%. Specifically, a substrate made of a transparent resin material including polyolefin resins such as an acrylic resin, a polycarbonate resin, an acrylic/styrene copolymer reins, a polyester resin and a polyethylene resin, or a glass plate may, for example, be used. Among them, a glass plate which has high transparency and surface flatness and further has high rigidity, is preferred. Particularly, tempered glass is more preferred, which is highly resistant to impact and the like and is hardly broken. A glass plate having high rigidity can easily cope with enlargement of a screen for PTV (for example, the size of the screen of at least 40 inches (1,016 mm)). Further, a glass plate is excellent in durability such as abrasion resistance and weather resistance and is less likely to be warped by the change in the air pressure, the impact from the outside, or the like. Accordingly, an influence by the warpage over a lens sheet which is combined with the diffusion plate, for example, a drawback such as abrasion due to rubbing between the lenticular sheet and the Fresnel sheet can be avoided.

In the preferred embodiment as shown in FIG. 1, the surface 100b (the surface on which no light diffusion layer 110 is formed) of the substrate 100 is the viewing screen on the diffusion plate 1. Accordingly, when the substrate 100 is a highly flat glass plate, the deterioration of the image quality of the display image due to swelling on the surface 100b of the substrate 100 is less likely to occur, and a high grade screen can be realized. Further, the light diffusion layer 110 can be formed by applying a coating liquid for forming a light diffusion layer (such as a coating material or an ink) having a matrix forming component and a light diffusion agent dispersed therein as described hereinafter. When the surface 100a (the surface on which the light diffusion layer 110 is to be formed) of the substrate 100 is highly flat, uniform coating with the coating material is easy, and a light diffusion layer 110 with a uniform thickness can be obtained, and resultingly, the scintillation resulting from non-uniform thickness (membrane unevenness) can be suppressed.

The thickness of the substrate varies depending upon the material and the size of the screen, and in the case of a glass plate, it is preferably from 1.5 to 4.5 mm. The substrate may be colored so as to improve contrast of the screen image. The colorant is preferably a dye or a pigment in a case where the substrate is made of a transparent resin material.

The matrix forming component constituting the matrix of the light diffusion layer 110 functions as a binder for the light diffusion agent after the layer is formed. Further, the matrix forming component is a material having adhesive properties to the substrate after the layer is formed, and is preferably transparent.

Further, the matrix forming component is preferably a material which makes it possible to form a layer by coating, particularly preferably a crosslinkable coating film material to be cured by heat, ultraviolet rays or the like. Such a matrix forming component may, for example, be a resin material such as a urethane resin, an acrylic resin, a styrene resin, a polycarbonate resin, a polymethylpentene resin, an acrylic/styrene copolymer resin, an epoxy resin, an olefin resin or a silicone resin, a crosslinked product obtainable from a hydrolyzate of a metal alkoxide, an inorganic material such as low melting glass, or a mixture thereof.

The refractive index of the matrix forming component is preferably from 1.42 to 1.59 in the case of an organic material and is preferably from 1.45 to 2.7 in the case of an inorganic material. The refractive index of the matrix forming component is substantially the same as the refractive index of the matrix to be formed from the matrix forming component. The material of the first matrix forming component constituting the first matrix in the first light diffusion layer 101 and the material of the second matrix forming component forming the second matrix in the second light diffusion layer 102 may be the same or different. The materials of the two matrix forming components are preferably the same in view of the production efficiency.

The light diffusion agent contained in the light diffusion layer 110 is not particularly limited so long as it is transparent fine particles, that is, fine particles which have substantially no absorption in the visible region, and it is fine particles having a fine particle size of about several micron. The light diffusion agent may, for example, be transparent inorganic oxide fine particles such as silica or alumina, inorganic fine particles such as glass beads, organic fine particles such as transparent polymer beads, or a mixture thereof. The light diffusion agent is preferably organic fine particles from such a reason that fine particles having a uniform particle size are likely to be obtained. The organic fine particles may, for example, be polymer beads. The polymer beads may be ones made of an acrylic resin, a styrene resin or a silicone resin, and particularly preferably crosslinked resin fine particles such as acrylic (PMMA) resin fine particles or MS (acrylic/styrene copolymer) resin fine particles in view of chemical resistance. The polymer beads are preferably spherical, whereby they are uniformly dispersed in the coating film.

The average particle size of the light diffusion agent is preferably from 1 to 20 μm, particularly preferably from 5 to 10 μm. If it is less than 1 μm, the wavelength dispersion is likely to occur in the refractive index of light, and if it exceeds 20 μm, the film tends to have a coarse brightness distribution in the plane. Further, the refractive index of the light diffusion agent varied depending upon the material but is not particularly limited so long as it satisfies the refractive index difference in the present invention. Specifically, the refractive index of the light diffusion agent is preferably from 1.42 to 1.59.

The materials of the first light diffusion agent and the second light diffusion agent respectively contained in the first light diffusion layer 101 and the second light diffusion layer 102 may be the same or different so long as the Δn and the volume fraction in the layer as described hereinafter are satisfied. Particularly, in order to satisfy a high volume fraction in the second light diffusion layer, at least the light diffusion agent in the second light diffusion layer is preferably spherical polymer beads which can be contained at a high density. Further, both the first light diffusion agent and the second light diffusion agent are preferably spherical polymer beads.

The first light diffusion agent to be contained in the first light diffusion layer is selected so that the refractive index difference $\Delta n_1$ with the first matrix is $0.04 \leq \Delta n_1 \leq 0.2$, preferably $0.05 \leq \Delta n_1 \leq 0.1$.

Further, the second light diffusion agent to be contained in the second light diffusion layer is selected so that the refractive index difference $\Delta n_2$ with the second matrix is $0.005 \leq \Delta n_2 \leq 0.04$, preferably $0.01 \leq \Delta n_2 \leq 0.03$. The refractive index of the matrix may be lower or higher than the refractive index of the light diffusion agent and is not particularly limited. In this specification, the refractive index difference means the absolute value of the difference between two refractive indices. When the refractive index difference in the first light diffusion layer and the refractive index difference in the second light diffusion layer are within the above ranges, desired diffusibility (viewing angle) can be obtained.

Not only one type but also a plural types of the first light diffusion agents and/or the second light diffusion agents may be used. In the case of a plural types, the above $\Delta n_1$ and $\Delta n_2$ are calculated from the following mathematical formula 1, where the types of the light diffusion agents are a light diffusion agent a, a light diffusion agent b, and so on:

$$\Delta n_1 (\Delta n_2) = \frac{A \times \begin{bmatrix} \text{Refractive index} \\ \text{difference} \\ \text{between light} \\ \text{diffusion agent } a \\ \text{and matrix} \end{bmatrix} + B \times \begin{bmatrix} \text{Refractive index} \\ \text{difference} \\ \text{between light} \\ \text{diffusion agent } b \\ \text{and matrix} \end{bmatrix} + \ldots}{[A] + [B] + \ldots}$$

In the above mathematical formula 1, A means (the mass content of the light diffusion agent a in the layer)/(the specific gravity of the light diffusion agent a), and B means (the mass content of the light diffusion agent b in the layer)/(the specific gravity of the light diffusion agent b).

From the above mathematical formula 1, when the refractive index difference between the light diffusion agent a and the matrix is $\Delta n_{1a}$ and so on in the case of the first light diffusion layer and $\Delta n_{2a}$ and so on in the case of the second light diffusion layer, the refractive index of the individual light diffusion agent is not necessarily within such a range of $0.04 \leq \Delta n_{1a} \leq 0.2$ or $0.005 \leq \Delta n_{2a} \leq 0.04$, and it only has to satisfy $\Delta n_1$ or $\Delta n_2$ determined from the above mathematical formula 1. However, the difference in the refractive index between each of the plural types of the light diffusion agents and the matrix is preferably $0.01 \leq \Delta n_{1a} \leq 0.2$ in the case of the first light diffusion layer or $0.005 \leq \Delta n_{1b} 0.08$ in the case of the second light diffusion layer with respect to all the light diffusion agents. If the refractive index difference is out of the above range, the degree of the diffusion may locally change, thus leading to non-uniform diffusion.

Further, in a case where two types of light diffusion agents are used as the plural types of light diffusion agents, the difference in the refractive index between the respective light diffusion agents is preferably from 0.01 to 0.3 in the case of the first light diffusion layer or from 0.005 to 0.1 in the case of the second light diffusion layer, whereby the diffusion will not be non-uniform.

Particularly, it is preferred to use a plural types of light diffusion agents for the second light diffusion layer, whereby uniformity of the diffusion will further increase.

The volume fraction of the first light diffusion agent in the first light diffusion layer (hereinafter sometimes referred to simply as the volume fraction (first) in the layer) is less than 40%, preferably at least 10% and less than 40%. Further, the volume fraction of the second light diffusion agent in the second light diffusion layer (hereinafter sometimes referred to simply as the volume fraction (second) in the layer) is at least 40%, preferably at least 40% and at most 60%. When the volume fraction in the first light diffusion layer and the volume fraction in the second light diffusion layer are within the above ranges, the number of very small diffusions can be increased, and resultingly, the diffusion will be uniformalized.

The volume fraction of the light diffusion agent in each layer (hereinafter sometimes referred to simply as the volume fraction in the layer) is a value obtained by dividing the volume percentage of the light diffusion agent in the layer by the sum of the volume percentage of the light diffusion agent in the layer and the volume percentage of the matrix. The volume fraction in the layer can be determined by observing the cross section of the light diffusion layer e.g. by SEM, and is substantially the same as the volume fraction of the light diffusion agent in the coating liquid (volume fraction in the liquid) as described hereinafter.

Further, in a case where a plural types of the first light diffusion agents and/or the second light diffusion agents are used, the volume fraction in the layer is calculated as the sum of the volume fractions in the layer of the respective light diffusion agents. Further, in the case of a plural types, the volume fraction (first) in the layer is less than 35%, preferably at least 10% and less than 35%. Further, the volume fraction (second) in the layer is at least 35%, preferably at least 35% and 60%. When the volume fraction in the first light diffusion layer and the volume fraction in the second light diffusion layer are within the above ranges, the number of very small diffusions can be increased, and resultingly, the diffusion will be uniformalized. Further, by use of a plural types of the light diffusion agents, a sufficient effect of uniformalizing the light can be obtained even if the volume fraction is slightly decreased.

Further, it is more preferred to use a plural types of second light diffusion agents and one type of a first light diffusion agent. By using a plural types of second light diffusion agents, an effect of increasing the uniformity of diffusion will be obtained by combination of plural types of diffusions.

In a case where two types of light diffusion agents are used as a plural types of light diffusion agents, it is preferred that (the volume fraction in the layer of a light diffusion agent having a higher refractive index)<(the volume fraction in the layer of a light diffusion agent having a lower refractive index), whereby the diffusion agents are contained at a higher density, and uniformity of the diffusion can be maintained. In such a case, the volume fraction in the layer of the light diffusion agent having a higher refractive index is preferably from 1 to 40%, and the volume fraction in the layer of the light diffusion agent having a lower refractive index is preferably from 60 to 99%.

In the light diffusion plate 1 of the present invention, the thickness of the light diffusion layer comprising at least two layers of the first light diffusion layer and the second light diffusion layer is from 5 to 200 μm by the thickness after curing, preferably from 10 to 100 μm. Further, by the thickness after curing, the thickness of the first light diffusion layer is preferably from 1 to 100 μm, particularly preferably from 2 to 50 μm, furthermore preferably from 20 to 30 μm, and the thickness of the second light diffusion layer is preferably from 1 to 100 μm, particularly preferably from 2 to 50 μm, furthermore preferably from 20 to 30 μm. Further, the visible light transmittance of the light diffusion plate is preferably at least 85% as stipulated in JIS K7361-1 (1997) so as to utilize light from a light source with no loss. Further, in the light diffusion layer, the light diffusion agent is preferably dispersed uniformly in the matrix.

The light diffusion layer in the present invention comprises at least two layers of the first light diffusion layer and the second light diffusion layer, and the second light diffusion layer may be formed via the first light diffusion layer on the substrate, or on the contrary, the first light diffusion layer may be formed via the second light diffusion layer. However, it is preferred to laminate the second light diffusion layer via the first light diffusion layer on the substrate, with a view to reducing the scintillation. Further, on the light diffusion plate of the present invention, a layer other than the first light diffusion layer and the second light diffusion layer may be formed, for example, an antistatic layer to prevent attachment of dust.

A light diffusion plate having the above layer structure can be formed by applying coating liquids for forming a light diffusion layer (hereinafter sometimes referred to simply as a coating liquid) having a matrix forming component and a light diffusion agent dispersed therein to a substrate. Coating is carried out separately using a separate coating liquid.

The coating liquid is usually a composition having a matrix forming component and a light diffusion agent dispersed in a liquid, and is preferably a uniform dispersion. The coating liquid further contains a curing agent for curing the matrix forming component as the case requires. The content of the curing agent in the coating liquid is preferably at most 20 mass %, more preferably at most 10 mass %, with a view to not impairing the properties of the diffusion plate. The coating liquid may further contain another component within a range not to impair the objects of the present invention. Such another component may, for example, be a reinforcing agent which is a component to improve adhesive properties to the substrates, a dispersing agent, a surfactant to increase wettability to the substrate, an antifoaming agent or a leveling agent. Such another component is contained preferably in an amount of at most 10 mass % in the coating liquid, with a view to not impairing properties of the diffusion plate. The solvent to be used for the coating liquid is properly selected from general purpose solvents suitable for coating.

The volume faction of the light diffusion agent in the coating liquid (hereinafter sometimes referred to simply as the volume fraction in the liquid) is preferably represented by the volume fraction represented by the following mathematical formula 2 considering properties of the light diffusion layer:

$$\text{Volume fraction in the liquid (\%)} = \frac{\left[\begin{array}{c}\text{Mass content of light diffusion}\\ \text{agent in coating liquid}\\ \hline \text{Specific gravity of light}\\ \text{diffusion agent}\end{array}\right]}{\left[\begin{array}{c}\text{Mass content of light}\\ \text{diffusion agent in}\\ \text{coating liquid}\\ \hline \text{Specific gravity of}\\ \text{light diffusion agent}\end{array}\right] + \left[\begin{array}{c}\text{Mass content of}\\ \text{matrix in}\\ \text{coating liquid}\\ \hline \text{Specific gravity}\\ \text{of matrix}\end{array}\right]} \times 100$$

In the above mathematical formula 2, the "mass content of light diffusion agent in coating liquid" means the mass content of the light diffusion agent based on the total mass of the matrix forming component, the curing agent and the light diffusion agent in the coating liquid, and the "mass content of matrix in coating liquid" means the total mass content of the matrix forming component and the curing agent based on the total mass of the matrix forming component, the curing agent and the light diffusion agent in the coating liquid. Further, the "specific gravity of light diffusion agent" means the specific gravity of the light diffusion agent itself, and the "specific gravity of matrix" means the mass-weighted average of the specific gravity of the matrix forming component and the specific gravity of the curing agent. The specific gravity of the light diffusion agent is preferably from 1.1 to 1.3 in the case of an organic material and is preferably from 1.9 to 5.5 in the case of an inorganic material. For example, in a case where the light diffusion agent is acrylic (PMMA) fine particles, the specific gravity is 1.2. Further, in a case where the light diffusion agent is an MS resin, the specific gravity can be calculated from the specific gravity (1.2) of the constituting units PMMA and the specific gravity (1.06) of PS and the ratio of the respective units in the copolymer. Further, the specific gravity of the matrix forming component is preferably from 1.1 to 1.3 in the case of an organic material and is preferably from 1.9 to 5.5 in the case of an inorganic material. For example, in a case where the matrix forming component is a urethane resin, the specific gravity is preferably from 1.12 to 1.24. The specific gravity of the curing agent is preferably from 1.1 to 1.2. The specific gravity of the bonding reinforcer for glass is preferably from 0.9 to 1.0.

Further, in a case where a plural types of light diffusion agents are used, the mass content is calculated as the sum of the mass contents of the respective light diffusion agents. Further, the specific gravity of the light diffusion agent is calculated from the following mathematical formula 3, where the types of the light diffusion agents are a light diffusion agent a, light diffusion agent b, and so on:

$$\text{Average specific gravity} = \frac{\begin{array}{c}\text{Mass content of light} \\ \text{diffusion agent } a \text{ in} \\ \text{coating liquid}\end{array} + \begin{array}{c}\text{Mass content of light} \\ \text{diffusion agent } b \text{ in} \\ \text{coating liquid}\end{array} + \ldots}{\left[\begin{array}{c}\text{Mass content of light} \\ \text{diffusion agent } a \text{ in} \\ \text{coating liquid} \\ \hline \text{Specific gravity of} \\ \text{light diffusion agent } a\end{array}\right] + \left[\begin{array}{c}\text{Mass content of light} \\ \text{diffusion agent } b \text{ in} \\ \text{coating liquid} \\ \hline \text{Specific gravity of} \\ \text{light diffusion agent } b\end{array}\right] + \ldots}$$

The volume fraction (hereinafter sometimes referred to simply as the volume fraction (first) in the liquid) of the light diffusion agent in a coating liquid for forming a first light diffusion layer (hereinafter sometimes referred to simply as a first coating liquid) to form the first light diffusion layer is preferably at least 1% and less than 40%. If it is less than 1%, the amount of the light diffusion agent is too small, whereby the function of the first diffusion layer can not be fulfilled, and if it is 40% or more, the light diffusibility is too significant, whereby the front brightness tends to decrease. The volume fraction (hereinafter sometimes referred to simply as the volume fraction (second) in the liquid) of the light diffusion agent in the coating liquid for forming a second light diffusion layer (hereinafter sometimes referred to simply as a second coating liquid) to form the second light diffusion layer is preferably at least 40% and at most 60%.

If it is less than 40%, the amount of the light diffusion agent is too small, whereby the reduction of the scintillation tends to be insufficient, and if it exceeds 60%, the proportion of the matrix is too small, whereby adhesive properties to the substrate tend to decrease. In a case where the matrix forming component is itself is a liquid, it may be used as a coating liquid as it is without using a solvent. Further, in order to obtain a sufficient thickness with which substantial effects can be achieved, the total solid content concentration in the coating liquid is preferably at least 10 mass %.

Further, in a case where a plural types of the first light diffusion agents and/or the second light diffusion agents are used, the volume fraction in the liquid is calculated as the sum of the mass contents of the respective light diffusion agents. Further, in the case of a plural types, the volume fraction (first) in the liquid is less than 35%, preferably at least 10% and less than 35%. Further, the volume fraction (second) in the liquid is at least 35%, preferably at least 35% and at most 60%. When the volume fraction in the liquid is within the above range, the number of very small diffusions can be increased, and resultingly, the diffusion can be uniformalized.

In a case where a plural types of light diffusion agents are used as the light diffusion agent, the volume fraction in the liquid is calculated from the following mathematical formula 4, where the types of the light diffusion agents are a light diffusion agent a, a light diffusion agent b, and so on:

$$\text{Volume fraction in the liquid (\%)} = \frac{[A] + [B] + \ldots}{[A] + [B] + \ldots + \left[\begin{array}{c}\text{Mass content of matrix} \\ \text{in coating liquid} \\ \hline \text{Specific gravity of} \\ \text{matrix}\end{array}\right]}$$

In the mathematical formula 4, A means (the mass content of the light diffusion agent a in the coating liquid)/(the specific gravity of the light diffusion agent a), and B means (the mass content of the light diffusion agent b in the coating liquid)/(the specific gravity of the light diffusion agent b).

In a case where two types of light diffusion agents are used as a plural types of the light diffusion agents, it is preferred that (the volume fraction in the liquid of a light diffusion agent having a higher refractive index)<(the volume fraction in the liquid of a light diffusion agent having a lower refractive index), whereby the light diffusion agents can be contained at a high density, and uniformity of the diffusion can be maintained. In such a case, the volume fraction of the light diffusion agent having a higher refractive index is preferably from 1 to 40%, and the volume fraction of the light diffusion agent having a lower refractive index is preferably from 60 to 99%.

The first light diffusion agent to be contained in the first coating liquid is selected so that the refractive index difference $\Delta n_1$ with the first matrix forming component is $0.04 \leq \Delta n_1 \leq 0.2$, preferably $0.05 \leq \Delta n_1 \leq 0.1$. Further, the second light diffusion agent to be contained in the second coating liquid is selected so that the refractive index difference $\Delta n_2$ with the second matrix forming component is $0.005 \leq \Delta n_2 < 0.04$, preferably $0.01 \leq \Delta n_2 \leq 0.03$. The refractive index of the matrix forming component may be lower or higher than the refractive index of the light diffusion agent and is not particularly limited. When the refractive index difference in the first light diffusion layer and the refractive index difference in the second light diffusion layer are within the above ranges, desired diffusibility (viewing angle) can be obtained.

Not only one types but also a plural types of the first light diffusion agents and the second light diffusion agents may be used. In the case of a plural types, the above $\Delta n_1$ and $\Delta n_2$ are calculated from the following mathematical formula 5, where the types of the light diffusion agents are a light diffusion agent a, a light diffusion agent b, and so on:

$$\Delta n_1(\Delta n_2) = \frac{A \times \begin{bmatrix} \text{Refractive index} \\ \text{difference} \\ \text{between light} \\ \text{diffusion agent } a \\ \text{and matrix} \end{bmatrix} + B \times \begin{bmatrix} \text{Refractive index} \\ \text{difference} \\ \text{between light} \\ \text{diffusion agent } b \\ \text{and matrix} \end{bmatrix} + \ldots}{[A] + [B] + \ldots}$$

In the above mathematical formula 5, A means (the mass content of the light diffusion agent a in the coating liquid)/(the specific gravity of the light diffusion agent a), and B means (the mass content of the light diffusion agent b in the coating liquid)/(the specific gravity of the light diffusion agent b).

From the above mathematical formula 5, when the refractive index difference between the light diffusion agent a and the matrix is $\Delta n_{1a}$ and so on in the case of the first light diffusion layer and $\Delta n_{2a}$ and so on in the case of the second light diffusion layer, the refractive index of the individual light diffusion agent is not necessarily within such a range of $0.04 \leq \Delta n_{1a} \leq 0.2$ or $0.005 \leq \Delta n_{2a} \leq 0.04$, and it only has to satisfy $\Delta n_1$ or $\Delta n_2$ determined from the above mathematical formula 5. However, the difference in the refractive index between each of the plural types of the light diffusion agents and the matrix is preferably $0.01 \leq \Delta n_{1a} \leq 0.3$ in the case of the first light diffusion layer or $0.005 \leq \Delta n_{1b} \leq 0.08$ in the case of the second light diffusion layer. If the refractive index difference is out of the above range, the degree of the diffusion may locally change, thus leading to non-uniform diffusion.

Further, in a case where two types of light diffusion agents are used as the plural types of light diffusion agents, the difference in the refractive index between the respective light diffusion agents is preferably from 0.01 to 0.3 in the case of the first light diffusion layer or from 0.005 to 0.1 in the case of the second light diffusion layer, whereby the diffusion will not be non-uniform.

The substrate is preferably a glass plate, whereby the coating liquid can be applied homogeneously as compared with a resin plate.

As a method of applying the coating liquid, a known method used for formation of a coating film, such as bar coating, spin coating, dip coating, screen printing or die coating can be applied without any restriction. Bar coating is particularly preferred. As a method for curing the coating film, as the case requires, heating, irradiation with ultraviolet rays or the like can be properly selected and applied in accordance with the matrix material. Heating is carried out preferably at a not so high temperature, and preferred is heating at a low temperature of from 80 to 150° C. in the air for from 5 to 60 minutes. It is preferred to apply the first (second) coating liquid, heat it under the above heating conditions and then apply the second (first) coating liquid.

The light diffusion plate of the present invention may have another membrane or a substrate in addition to the above substrate and light diffusion layers, within a range not to impair the objects of the present invention. For example, a low-reflection film to prevent reflection of external light or a film having anti-glare treatment applied thereto (both are not shown) may be laminated on the viewing screen of the substrate, or anti-glare treatment may be applied to the viewing screen of the substrate. As materials and methods to impart low reflection properties and anti-glare properties, a known technique can be properly applied.

Figure 2:
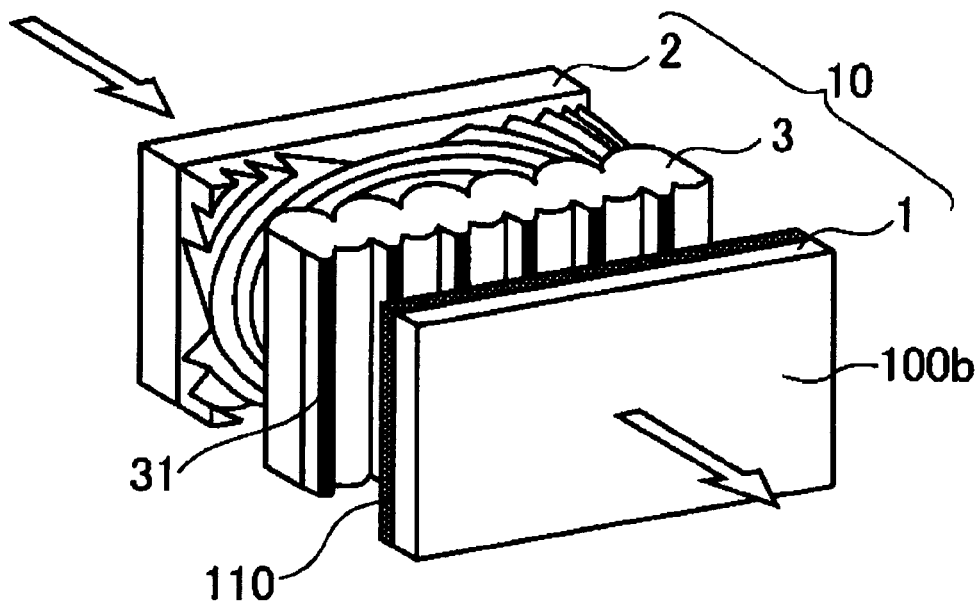
FIG. 2 is a perspective view schematically illustrating one embodiment of the transmission screen of the present invention.
Figure 3:
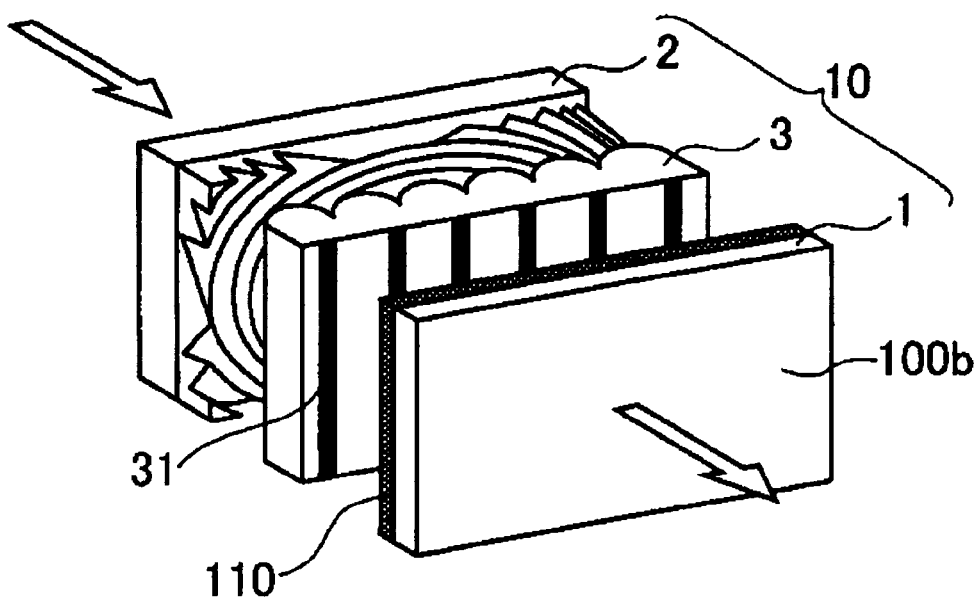
FIG. 3 is a perspective view schematically illustrating another embodiment of the transmission screen of the present invention.
Figure 4:
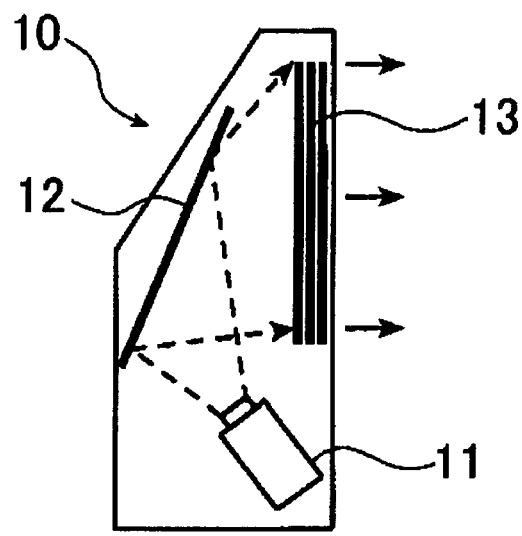
FIG. 4 is a view illustrating a rear-projection television.
Figure 5:
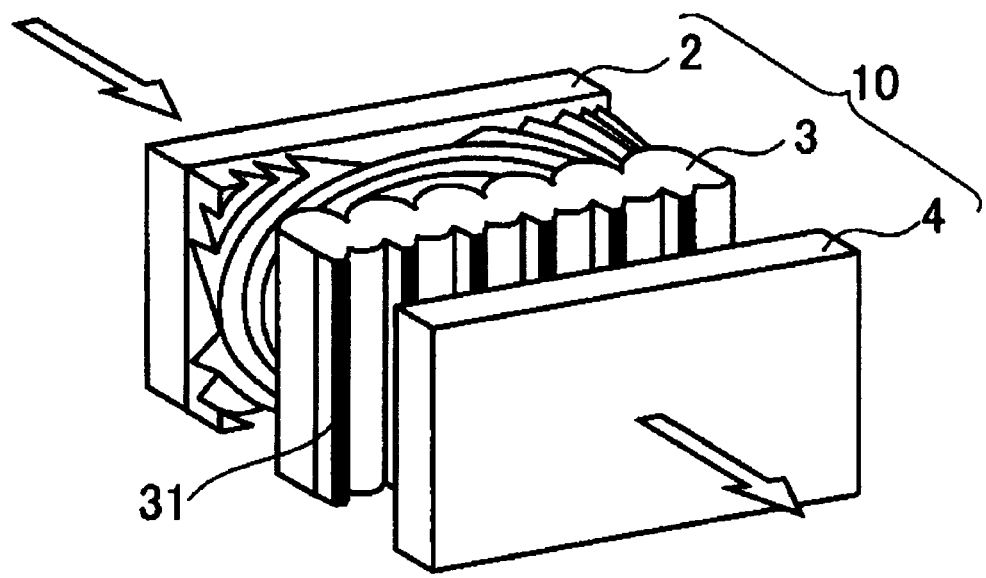
FIG. 5 is a perspective view schematically illustrating a conventional transmission screen.

The transmission screen of the present invention is not particularly limited so long as it contains the above light diffusion plate and the light diffusion layer of the light diffusion plate is disposed on the light emission side of the lens sheet. FIG. 2 is a perspective view schematically illustrating one embodiment of the transmission screen of the present invention. FIG. 3 is a perspective view schematically illustrating another embodiment of the transmission screen containing another lenticular sheet 3.

In the transmission screen 10, a Fresnel sheet 2, a lenticular sheet 3 and a diffusion plate 1 are disposed in this order, and the diffusion plate 1 is disposed so that the light diffusion layer 110 side is on the lenticular sheet 3 side. In the respective drawings, the same symbol represents the same or corresponding member and duplicate description will be omitted.

In each drawing, the arrow represents the direction of progress of projected light from an optical engine (not shown).

The Fresnel sheet 2 is a lens sheet to emit an image light from the optical engine as approximately parallel rays (toward the observer) to uniformly brighten the entire image. The lenticular sheet 3 is a lens sheet comprising a group of convex cylindrical lenses which refract the approximately parallel rays from the Fresnel sheet 2 in the horizontal direction arranged in parallel in the horizontal direction, and refracts and diffuses the image light in the right and left direction of an observer and emits the light while enlarging the viewing angle (observation region) in the horizontal direction.

On the light transmission surface of each lens sheet, the above lenses are formed, and the shape of the lenses varies depending upon the optical engine. For example, in the case of a transmission screen to be used for a CRT type PTV, a lenticular sheet 3 having lenses formed on both sides as shown in FIG. 2 is used in many cases. Further, in the case of a transmission screen to be used for a high precision MD type PTV such as liquid crystal with small exit pupil diameter of a projector lens, a lenticular sheet 3 having lenses formed on only one side as shown in FIG. 3 is used in many cases.

Further, on the emission side of the lenticular sheet 3, a striped light shielding layer 31 which absorbs external light is preferably formed on a non-light condensing region through which no screen light passes, so as to improve the contrast. The above lens sheet can be properly selected from known ones and combined with the diffusion plate 1 depending upon the type and the is like of the optical engine.

The above transmission screen is suitable as a transmission screen for a rear-projection PTV, particularly a high precision PTV such as MD with high directivity of projected light.

In the light diffusion plate of the present invention, by the refractive index difference $\Delta n_2$ in the second light diffusion layer being a small value, the fine particle concentration in the second light diffusion layer can be increased, and further, it is possible to uniformalize diffusion of the light. Further, by the refractive index difference $\Delta n_1$ in the first light diffusion layer being a large value, it is possible to satisfy both maintenance of the brightness and enlargement of the viewing angle. Further, due to diffusion different from the second light diffusion layer, it is possible to uniformalize the diffusion and to prevent the scintillation. Further, by the volume fraction in the layer being within a preferred range, the number of very small diffusions can be increased, and resultingly, the diffusion can be uniformalized.

Now, the present invention will be described in further detail with reference to Examples and Comparative Examples, but it should be understood that the present invention is by no means restricted to such specific Examples.

EXAMPLE 1

(Preparation of Coating Liquid A)

100 g of a urethane resin solution (two-pack type curable screen ink MAB000, solid content: 45 mass %, specific gravity of resin: 1.2, refractive index: 1.55) as a matrix forming component, 5 g of a curing agent (210 curing agent, specific gravity: 1.1) for the above urethane resin, 0.5 g of a bonding reinforcer for glass (manufactured by Teikoku Printing Inks Mfg. Co., Ltd.) and 17.5 g of acrylic resin fine particles (manufactured by Sekisui Chemical Co., Ltd., MBX-8 (spherical fine particles of crosslinked PMMA), specific gravity: 1.2, average particle size: 8 μm, refractive index: 1.49) as a light diffusion agent were mixed and stirred to obtain a coating liquid A. The volume fraction in the liquid of the coating liquid A was 26%, and the solid content concentration was 14 mass %.

(Preparation of Coating Liquid B)

A coating liquid B was obtained in the same manner as above except that 41 g of MS resin fine particles (manufactured by Sekisui Chemical Co., Ltd., SMX-8M (spherical fine particles of crosslinked PMMA/PS), specific gravity: 1.1, average particle size: 8 μm, refractive index: 1.56) were used as a light diffusion agent instead of the acrylic resin fine particles. The volume fraction in the liquid of the coating liquid B was 47%, and the solid content concentration was 28 mass %.

The volume fraction in the liquid was calculated from mathematical formula 2. The specific gravity of the matrix used in mathematical formula 2 is calculated by mass-weighted averaging the specific gravities and the contents of the urethane resin as the matrix forming component and the curing agent. The specific gravity of the matrix in Example 1 thus determined was 1.19. In the following Examples, the specific gravity of the matrix determined from the above calculation was used for calculation of the volume fraction in the liquid.

(Formation of Light Diffusion Layer)

To the surface of a 30 cm square glass plate (non-tempered glass, thickness: 3 mm, visible light transmittance (JIS K7361-1 (1997)): 91%), the coating liquid A was applied by a bar coater (No. 22) and dried by a drier at 150° C. for 30 minutes in the air to form a first light diffusion layer. Then, the coating liquid B was applied by a bar coater (No. 22) and dried by a drier at 150° C. for 30 minutes in the air to laminate a second light diffusion layer, thereby to obtain a light diffusion plate having light diffusion layers formed on one side of the glass plate. The light diffusion plate was subjected to the following evaluation. The layer structure and the evaluation results are shown in table 1, and the compositions of the coating liquids are shown in Table 2. The contrast of the obtained light diffusion plate is favorable.

The volume fraction in the layer is determined by observing the cross section of each layer by SEM photographs. Further, the layer thickness was determined by a micrometer.

(Evaluation)

Front Brightness (Peak Gain)

The light diffusion plate was irradiated at a certain constant illuminance by a projector (manufactured by Hitachi, Limited, PJ-TX10-J) with the face on which the light diffusion layers were formed on the light source side. The brightness on the side opposite to the light source was measured by a brightness photometer (manufactured by KONIKA MINOLTA HOLDINGS, INC., CS-1000A). It is preferably at least 1,100 from a practical viewpoint.

Diffusibility (Viewing Angle)

Under the above conditions for measurement of the front brightness, the brightness was measured while changing the angle of the brightness photometer to the light diffusion plate, and the angle ($\alpha$) at which the brightness was half the front brightness was determined. The evaluation standards are as follows. ○ is preferred from a practical viewpoint.

○: $\alpha \geq 11°$
Δ: $9° \leq \alpha < 11°$
X: $\alpha < 9°$

Scintillation: Under the above conditions for measurement of the front brightness, the scintillation was visually evaluated. The evaluation standards are as follows.

◎: The scintillation not offensive at all during watching.
○: The scintillation not offensive during watching.
Δ: The scintillation occurs and is slightly offensive during watching.
X: The scintillation significant, and watching disturbed.

Resolution: Under the above conditions for measurement of the front brightness, the resolution was visually evaluated. The evaluation standards are as follows.

○: The resolution being high, and the outline being clear.
Δ: The resolution being slightly low, and the outline being unclear.
X: The resolution being low, and the image being blurred.

EXAMPLE 2

Light diffusion layers were formed on one side of a glass plate to obtain a light diffusion plate in the same manner as in Example 1 except that the order of application of the coating liquids A and B was inverse. The light diffusion plate was subjected to the same evaluation as in Example 1. The layer structure and the evaluation results are shown in Table 1, and the compositions of the coating liquids are shown in Table 2. The contrast of the obtained light diffusion plate is good.

COMPARATIVE EXAMPLE 1

(Preparation of Coating Liquid)

A coating liquid C was prepared in the same manner as in preparation of the coating liquid A except that the amount of the light diffusion agent was the amount as identified in Table 2. The volume fraction in the liquid in the coating liquid C was 44%, and the solid content concentration was 27 mass %. Further, a coating liquid D was prepared in the same manner as in preparation of the coating liquid B except that the amount of the light diffusion agent was the amount as identified in Table 2. The volume fraction in the liquid in the coating liquid D was 27%, and the solid content concentration was 14 mass %.

(Formation of Light Diffusion Layer)

Light diffusion layers were formed to obtain a light diffusion plate in the same manner as in Example 1 except that the coating liquids C and D were used instead of the coating liquids A and B, respectively. The light diffusion plate was subjected to evaluation in the same manner as in Example 1. The layer structure and the evaluation results are shown in Table 1, and the compositions of the coating liquids are shown in Table 2.

COMPARATIVE EXAMPLE 2

Light diffusion layers were formed to obtain a light diffusion plate in the same manner as in Example 2 except that the coating liquids D and C were used instead of the coating liquids A and B, respectively. The light diffusion plate was subjected to evaluation in the same manner as in Example 1. The layer structure and the evaluation results are shown in Table 1, and the compositions of the coating liquids are shown in Table 2.

COMPARATIVE EXAMPLE 3

A coating liquid E was prepared in the same manner as in preparation of the coating liquid A except that the amount of the light diffusion agent was the amount as identified in Table 2. The volume fraction in the liquid in the coating liquid E was 33%, and the solid content concentration was 19 mass %.

To the surface of a 30 cm square glass plate (non-tempered glass, thickness: 3 mm, visible light transmittance (JIS K7361-1 (1997)): 91%), the coating liquid E was applied by a bar coater (No. 22) and dried by a drier at 150° C. for 30 minutes in the air to form a light diffusion layer, thereby to obtain a light diffusion plate.

The light diffusion plate was subjected to evaluation in the same manner as in Example 1. The layer structure and the evaluation results are shown in Table 1, and the composition of the coating liquid is shown in Table 2.

COMPARATIVE EXAMPLE 4

A light diffusion plate was obtained in the same manner as in Comparative Example 3 except that the coating liquid B was used instead of the coating liquid E. The light diffusion plate was subjected to evaluation in the same manner as in Example 1. The layer structure and the evaluation results are shown in Table 1, and the composition of the coating liquid is shown in Table 2.

COMPARATIVE EXAMPLE 5

A coating liquid F was obtained in the same manner as in preparation of the coating liquid B except that the amount of the light diffusion agent used was 80 g. The volume fraction in the liquid in the coating liquid F was 63%.

A light diffusion plate was obtained in the same manner as in Comparative Example 3 except that the coating liquid F is used instead of the coating liquid E. The light diffusion plate was subjected to evaluation in the same manner as in Example 1. The layer structure and the evaluation results are shown in Table 1, and the composition of the coating liquid is shown in Table 2.

COMPARATIVE EXAMPLE 6

A commercially available light diffusion agent-incorporated plate was subjected to evaluation in the same manner as in Example 1. The layer structure and the evaluation results are shown in Table 1.

The formed light diffusion plate in each Example has a visible light transmittance of at least 90%.

Further, with respect to the light diffusion plates in Examples 1 and 2, Example 3 described hereinafter and Comparative Examples 1 to 5, the dispersion was evaluated by a CCD type brightness photometer and as a result, the diffusion is uniform in each Example. Further, the formed light diffusion plate is excellent in durability such as abrasion resistance and weather resistance in each Example.

TABLE 1

| | | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| | | | | Light source side | | | | | |
| Second layer | Matrix forming component | | | Urethane resin | | Nil | Nil | Nil | Nil |
| | Refractive index n | | | 1.55 | | | | | |
| | Light diffusion agent (fine particles) | ** | *** | ** | *** | | | | |
| | Refractive index n | 1.56 | 1.49 | 1.56 | 1.49 | | | | |
| | $\Delta n_2$ *1 | 0.01 | 0.06 | 0.01 | 0.06 | | | | |
| | Volume fraction in the layer (%) *2 | 46 | 25 | 27 | 44 | | | | |
| | Thickness (μm) | | 25 | | | | | | |
| First layer | Matrix forming component | | | Urethane resin | | | | | 2 mm Incorporated plate *3 |
| | Refractive index n | | | 1.55 | | | | | |
| | Light diffusion agent (fine particles) | *** | ** | *** | ** | *** | | ** | |
| | Refractive index n | 1.49 | 1.56 | 1.49 | 1.56 | 1.49 | | 1.56 | |
| | $\Delta n_1$ *1 | 0.06 | 0.01 | 0.06 | 0.01 | 0.06 | | 0.01 | |
| | Volume fraction in the layer (%) *2 | 25 | 46 | 44 | 27 | 33 | 46 | 64 | |
| | Thickness (μm) | | | 25 | | | | | |
| | Substrate | | | Glass plate (thickness: 3 mm) | | | | | |
| Evaluation | Front brightness cd/m² | 1400 | 1400 | 900 | 1000 | 1500 | 2000 | *4 Evaluation impossible | 1400 |
| | Diffusibility | ○ | ○ | ○ | ○ | ○ | X | | ○ |
| | Scintillation | ⊚ | ○ | Δ | Δ | Δ | X | | ○ |
| | Resolution | ○ | ○ | ○ | ○ | ○ | ○ | | Δ |

** MS resin
*** Acrylic resin
*1 Δn: The refractive index difference (absolute value) between the matrix and the fine particles
*2 The volume fraction of the light diffusion agent to the matrix in the layer
*3 A diffusion plate having fine particles of a light diffusion agent incorporated (commercially available product, thickness: 2 mm)
*4 Membrane unevenness is so significant that evaluation was impossible with regard to all the items

TABLE 2

| Composition by parts by mass) | | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|
| Second layer | Coating liquid | B | A | D | C | | | |
| | Urethane resin solution *1 | | | 100 | | | | |
| | Curing agent *2 | | | 5 | | | | |
| | Bonding reinforcer for glass *3 | | | 0.5 | | | | |
| | Light diffusion agent (fine particles) | ** 41 | *** 17.5 | ** 17.5 | *** 40 | | | |
| First layer | Coating liquid | A | B | C | D | E | B | F |
| | Urethane resin solution *1 | | | | 100 | | | |
| | Curing agent *2 | | | | 5 | | | |
| | Bonding reinforcer for glass *3 | | | | 0.5 | | | |
| | Light diffusion agent (fine particles) | *** 17.5 | ** 41 | *** 40 | ** 17.5 | *** 25 | ** 41 | ** 80 |

** MS resin
*** Acrylic resin
*1 Two-pack type curable screen ink
*2 Curing agent (210 curing agent)
*3 Bonding reinforcer for glass (manufactured by Teikoku Printing Inks Mfg. Co., Ltd.)

EXAMPLE 3

(Preparation of Coating Liquid)

A coating liquid A2 was prepared in the same manner as in Example 1 except that 14.2 g of styrene resin fine particles (manufactured by Sekisui Chemical Co., Ltd., SBX-4, spherical fine particles of crosslinked polystyrene), specific gravity: 1.06, average particle size: 4 μm, refractive index: 1.59) were used instead of 17.5 g of the acrylic resin fine particles as the light diffusion agent in the coating liquid A. The volume fraction in the liquid in the coating liquid A2 was 24%, and the solid content concentration was 12 mass %. The refractive index difference Δn between the matrix and the light diffusion agent was 0.04.

Further, a coating liquid B2 was prepared in the same manner as in Example 1 except that two types of fine particles i.e. 14 g of acrylic resin fine particles (manufactured by Sekisui Chemical Co., Ltd., MBX-8 (spherical fine particles of crosslinked PMMA), specific gravity: 1.2, average particle size: 8 μm, refractive index: 1.49) and 20 g of MS resin fine particles (manufactured by Sekisui Chemical Co., Ltd., SMX-8M (spherical fine particles of PMMA/PS), specific gravity: 1.1, average particle size: 8 μm, refractive index: 1.56) were used instead of 41 g of the MS resin fine particles as the light diffusion agent in the coating liquid B. The refractive index difference Δn between the matrix and the light diffusion agent was 0.03 as calculated from the mathematical formula 5.

The volume fraction in the liquid in the coating liquid B2 was 41% as the total of two types of the fine particles as calculated from the mathematical formula 4, and the solid content concentration was 24 mass % as the total of two types of the fine particles.

(Formation of Light Diffusion Layer)

Light diffusion layers were formed to obtain a light diffusion plate in the same manner as in Example 1 except that the coating liquids A2 and B2 were used instead of the coating liquids A and B, respectively. The refractive index difference $\Delta n_1$ between the first light diffusion agent and the first matrix in the first light diffusion layer was 0.04, and the refractive index difference $\Delta n_1$ between the second light diffusion agent and the second matrix in the second light diffusion layer was 0.03 as calculated from the mathematical formula 1.

The volume fraction in the layer was determined by observing the cross section of each layer by SEM photographs, and it was 24% in the first light diffusion layer and 41% in the second light diffusion layer. The thickness was measured by a micrometer, and both the layers had a thickness of 25 μm.

The light diffusion plate was subjected to evaluation in the same manner as in Example 1. As a result, the front brightness was 1,400, and the results of the viewing angle and the resolution were ○, and the result of the scintillation was ⊚. The contrast of the obtained light diffusion plate is good.

In Examples 1 and 2, the refractive index difference and the volume fraction are within the ranges of the present invention, and the diffusibility, the scintillation and the resolution are good. Further, the brightness is the same level as the incorporated plate and is good.

Particularly in Example 3, since a plurality of light diffusion agents were used for the second light diffusion layer, uniformity of the diffusion is further increased and as a result, the diffusibility, the scintillation and the resolution are good.

Whereas in Comparative Examples 1 and 2, the refractive index difference and the volume fraction of the second diffusion layer are out of the ranges of the present invention, the number of very small diffusions can not be increased, and the scintillation tends to deteriorate. Further, the brightness is low since fine particles providing a large refractive index difference with the matrix are contained in a large amount.

In Comparative Examples 3 to 5 in which only one diffusion layer is provided, the scintillation properties are not satisfied. Further, the incorporated plate in Comparative Example 6 has a thick light diffusion layer of 2 mm, such leads to poor resolution.

The light diffusion plate of the present invention is useful as a light diffusion plate for a transmission screen for a PTV, a light diffusion plate for backlight of a liquid crystal display panel, etc.

The entire disclosure of Japanese Patent Application No. 2005-165908 filed on Jun. 6, 2005 including specification, claims, drawings and summary is incorporated herein by reference in its entirety.

What is claimed is:

1. A light diffusion plate comprising a substrate and a light diffusion layer formed on the substrate, wherein
the light diffusion layer comprises at least two layers of a first light diffusion layer containing a first matrix and a first light diffusion agent having a refractive index difference $\Delta n_1$ of 0.06 with the first matrix, and a second light diffusion layer disposed upon the first light diffusion layer and containing a second matrix and a second light diffusion agent having a refractive index difference $\Delta n_2$ of 0.01 with the second matrix;
the volume fraction of the first light diffusion agent in the first light diffusion layer is about 25%, and the volume fraction of the second light diffusion agent in the second light diffusion layer is about 46%; and the total thickness of the light diffusion layers is about 50 μm after curing.

2. The light diffusion plate according to claim 1, wherein plural types of the first light diffusion agents and/or the second light diffusion agents are used.

3. The light diffusion plate according to claim 2, wherein in a case where two types of light diffusion agents are used as the second light diffusion agent, the difference in the refractive index between the two light diffusion agents is from 0.005 to 0.1.

4. The light diffusion plate according to claim 1, which has a visible light transmittance (JIS K7361-1 (1997)) of at least 85%.

5. The light diffusion plate according to claim 1, wherein the substrate is a glass plate.

6. The light diffusion plate according to claim 1, wherein the second light diffusion layer is formed on the substrate through contact with the first light diffusion layer.

7. A transmission screen comprising a Fresnel sheet, a lenticular sheet and the light diffusion plate as defined in claim 1, wherein the Fresnel sheet, the lenticular sheet and the light diffusion plate are disposed in this order so that the light diffusion layer side of the light diffusion plate is on the lenticular sheet side.

8. A rear-projection television using the transmission screen as defined in claim 7.

9. A process for producing a light diffusion plate comprising a substrate and a light diffusion layer formed on the substrate, which comprises the steps of:

applying a coating liquid for forming a first light diffusion layer which contains a first matrix forming component and a first light diffusion agent having a refractive index difference $\Delta n_1$ of about 0.06 with the first matrix forming component and has a volume fraction in the liquid of the first light diffusion agent less than 40% as defined by the following mathematical formula 2, to the substrate; and applying a coating liquid for forming a second light diffusion layer disposed upon the first light diffusion layer and which contains a second matrix forming component and a second light diffusion agent having a refractive index difference $\Delta n_2$ of about 0.01 with the second matrix forming component and has a volume fraction in the liquid of the second light diffusion agent of at least 40% as defined by the following mathematical formula 2, to the substrate to form light diffusion layers:

$$\text{Volume fraction in the liquid (\%)} = \frac{\left[\dfrac{\text{Mass content of light diffusion agent in coating liquid}}{\text{Specific gravity of light diffusion agent}}\right]}{\left[\dfrac{\text{Mass content of light Diffusion agent in coating liquid}}{\text{Specific gravity of light diffusion agent}}\right] + \left[\dfrac{\text{Mass content of matrix in coating liquid}}{\text{Specific gravity of matrix}}\right]} \times 100.$$

10. A process for producing a light diffusion plate comprising a substrate and a light diffusion layer formed on the substrate, which comprises the steps of:

applying a coating liquid for forming a first diffusion layer which contains a first matrix forming component and a first light diffusion agent having a refractive index difference $\Delta n_1$ of about 0.06 with the first matrix forming component and has a volume fraction in the liquid of the first light diffusion agent less than 35% as defined by the following mathematical formula 4, to the substrate; and applying a coating liquid for forming a second light diffusion layer disposed upon the first light diffusion layer and which contains a second matrix forming component and a second light diffusion agent having a refractive index difference $\Delta n_2$ of about 0.01 with the second matrix forming component and has a volume fraction in the liquid of the second light diffusion agent of at least 35% as defined by the following mathematical formula 4, to the substrate, wherein a plural types of the first light diffusion agents and/or the second light diffusion agents are used:

$$\text{Volume (\%)} = \frac{[A] + [B] + \ldots}{[A] + [B] + \ldots + \left[\dfrac{\text{Mass content of matrix in coating liquid}}{\text{Specific gravity of matrix}}\right]}$$

wherein A is (the mass content of the light diffusion agent a in the coating liquid)/(the specific gravity of the light diffusion agent a), and B is (the mass content of the light diffusion agent b in the coating liquid)/(the specific gravity of the light diffusion agent b), where the types of the light diffusion agents contained in the first light diffusion agent and/or the second light diffusion agent are a light diffusion agent a, a light diffusion agent b, and so on.

11. A light diffusion plate comprising a substrate and a light diffusion layer formed on the substrate, wherein the light diffusion layer comprises at least two layers of a first light diffusion layer containing a first matrix and a first light diffusion agent having a refractive index difference $\Delta n_1$ with the first matrix, and a second light diffusion layer disposed upon the first light diffusion layer and containing a second matrix and a second light diffusion agent having a refractive index difference $\Delta n_2$ with the second matrix, wherein $\Delta n_1 < \Delta n_2$;

the volume fraction of the first light diffusion agent in the first light diffusion layer is less than 40%, and the volume fraction of the second light diffusion agent in the second light diffusion layer is at least 40%; and the total thickness of the light diffusion layers is at least about 50 μm after curing.

12. A process for producing a light diffusion plate comprising a substrate and a light diffusion layer formed on the substrate, which comprises the steps of:

applying a coating liquid for forming a first light diffusion layer which contains a first matrix forming component and a first light diffusion agent having a refractive index difference $\Delta n_1$ with the first matrix forming component and has a volume fraction in the liquid of the first light diffusion agent less than 40% as defined by the following mathematical formula 2, to the substrate; and applying a coating liquid for forming a second light diffusion layer disposed upon the first light diffusion layer and which contains a second matrix forming component and a second light diffusion agent having a refractive index difference $\Delta n_2$ with the second matrix forming component, wherein $\Delta n_1 < \Delta n_2$, and has a volume fraction in the liquid of the second light diffusion agent of at least 40% as defined by the following mathematical formula 2, to the substrate to form light diffusion layers:

$$\text{Volume fraction in the liquid (\%)} = \frac{\left[\dfrac{\text{Mass content of light diffusion agent in coating liquid}}{\text{Specific gravity of light diffusion agent}}\right]}{\left[\dfrac{\text{Mass content of light Diffusion agent in coating liquid}}{\text{Specific gravity of light diffusion agent}}\right] + \left[\dfrac{\text{Mass content of matrix in coating liquid}}{\text{Specific gravity of matrix}}\right]} \times 100.$$

13. A process for producing a light diffusion plate comprising a substrate and a light diffusion layer formed on the substrate, which comprises the steps of:

applying a coating liquid for forming a first diffusion layer which contains a first matrix forming component and a first light diffusion agent having a refractive index difference $\Delta n_1$ with the first matrix forming component and has a volume fraction in the liquid of the first light diffusion agent less than 35% as defined by the following mathematical formula 4, to the substrate; and applying a coating liquid for forming a second light diffusion layer disposed upon the first light diffusion layer and which contains a second matrix forming component and a second light diffusion agent having a refractive index difference $\Delta n_2$ with the second matrix forming component, wherein $\Delta n_1 < \Delta n_2$, and has a volume fraction in the liquid of the second light diffusion agent of at least 35% as defined by the following mathematical formula 4, to the substrate, wherein a plural types of the first light diffusion agents and/or the second light diffusion agents are used:

$$\text{Volume (\%)} = \frac{[A]+[B]+\ldots}{[A]+[B]+\ldots+\left[\dfrac{\text{Mass content of matrix in coating liquid}}{\text{Specific gravity of matrix}}\right]}$$

wherein A is (the mass content of the light diffusion agent a in the coating liquid)/(the specific gravity of the light diffusion agent a), and B is (the mass content of the light diffusion agent b in the coating liquid)/(the specific gravity of the light diffusion agent b), where the types of the light diffusion agents contained in the first light diffusion agent and/or the second light diffusion agent are a light diffusion agent a, a light diffusion agent b, and so on.

* * * * *